United States Patent [19]
Keener

[11] Patent Number: 5,586,457
[45] Date of Patent: Dec. 24, 1996

[54] VEHICLE ANTI-THEFT DEVICE

[76] Inventor: Manuel L. Keener, P.O. Box 6625, Dothan, Ala. 36302

[21] Appl. No.: 355,253

[22] Filed: Dec. 9, 1994

[51] Int. Cl.⁶ .............................. F16H 57/00; G05G 5/00
[52] U.S. Cl. .................. 70/201; 70/237; 70/255; 70/257; 292/144; 292/DIG. 25; 180/287
[58] Field of Search .............. 70/237, 279, 238, 70/201, 202, 254–258; 292/144, 343, DIG. 25; 180/287

[56] References Cited

U.S. PATENT DOCUMENTS

| | | |
|---|---|---|
| 1,251,591 | 1/1918 | Stoddart . |
| 1,516,482 | 11/1924 | Gray . |
| 1,676,623 | 7/1928 | Turner ........................................ 70/256 |
| 1,770,801 | 7/1930 | Perrelly ...................................... 70/202 |
| 2,765,648 | 10/1956 | Hatcher .................................... 292/144 |
| 2,785,916 | 3/1957 | Mutti ....................................... 292/144 |
| 2,931,207 | 4/1960 | Fisher . |
| 3,142,166 | 7/1964 | Adam et al. . |
| 3,470,974 | 10/1969 | Pefine ...................................... 180/287 |
| 3,631,694 | 1/1972 | Teroux . |
| 3,686,672 | 8/1972 | Ishuzuka . |
| 3,725,939 | 4/1973 | Saltzstein . |
| 3,989,286 | 11/1976 | Cleff ........................................ 292/144 |
| 4,076,095 | 2/1978 | Adamski . |
| 4,369,481 | 1/1983 | Early . |
| 4,566,556 | 1/1986 | Wodeslavsky ........................... 180/287 |
| 4,663,626 | 5/1987 | Smith . |
| 4,825,210 | 4/1989 | Bachhuber et al. . |
| 4,881,148 | 11/1989 | Lambropoulos et al. . |
| 5,040,387 | 8/1991 | Knott, Jr. . |
| 5,094,092 | 3/1992 | Hsieh . |
| 5,119,065 | 6/1992 | Wiehagen . |
| 5,263,345 | 11/1993 | Zagorac ..................................... 70/254 |
| 5,282,373 | 2/1994 | Riccitelli . |
| 5,363,270 | 11/1994 | Wahba . |

FOREIGN PATENT DOCUMENTS 3105175  9/1982  Germany .

Primary Examiner—Darnell M. Boucher
Attorney, Agent, or Firm—Richard C. Litman

[57] ABSTRACT

A vehicle disablement system that prevents and deters the unauthorized use of a vehicle by limiting engine operation to idle speed. A pedal obstructing device is located beneath the accelerator pedal of the vehicle that is selectively movable between an obstructing position, engaging the pedal, and an enablement position, clearing the pedal. The pedal obstructing device is moved into the obstructing position by an electromagnetic actuator (e.g., a solenoid) or by a motor. The device is locked into the obstructing position by a locking arm which is electromagnetically activated. In an alternative embodiment of the system, the electromagnetic actuator or the motor is controlled from a remotely operated transmitter.

13 Claims, 2 Drawing Sheets

VEHICLE ANTI-THEFT DEVICE

BACKGROUND OF THE INVENTION

1. Field of the Invention

The present invention relates to a vehicle disablement system which prevents unauthorized use of a motor vehicle.

2. Description of the Prior Art

Automobile theft continues to be a serious problem in the United States. Despite the development of a variety of systems which are designed to prevent or deter a thief from stealing an automobile, the rate of automobile thefts in the United States continues to climb. Particularly disturbing is the rapid increase in the number of "carjackings"—theft of the vehicle while the driver is operating the vehicle.

Carjackings often occur when the vehicle is stopped at a traffic signal. The thief approaches the vehicle and forces his way into the vehicle. Conventional vehicle disablement systems are of little assistance to the victim because they typically do not prevent theft of the vehicle while the vehicle is in operation. For this reason, thieves turn to carjacking as an easy way to steal a vehicle. No vehicle anti-theft device is seen in the prior art which effectively prevents or deters "carjacking". For the foregoing reasons there is a need for a vehicle anti-theft system which deters and prevents "carjacking".

Obstructing devices for the pedals of a motor vehicle have been proposed as being effective for preventing the unauthorized use of vehicles. Often, such a pedal obstructing device must be manually placed under the pedal by the driver prior to each use of the device. In addition, any such device must be manually removed from beneath the pedal prior to operating the vehicle. Illustrative of these types of pedal obstructing devices are those disclosed in U.S. Pat. No. 1,251,591, issued to Stoddart; U.S. Pat. No. 4,076,095, issued to Adamski; U.S. Pat. No. 5,094,092, issued to Hsieh; and U.S. Pat. No. 5,282,373, issued to Riccitelli. The pedal obstructing devices shown in these patents do not teach or suggest a pedal obstructing device that is permanently placed in position to operate on the pedals of the vehicle.

U.S. Pat. No. 1,516,482, issued to Gray, shows a pedal obstructing device that is mounted on the steering column of the vehicle. The Gray patent does not teach or suggest a pedal obstructing device that is retractable into the cabin wall or firewall of the vehicle.

U.S. Pat. No. 3,631,694, issued to Teroux, shows a pedal obstructing device consisting of a post mounted between the cabin wall and dashboard of the vehicle and a bar that extends perpendicularly from the post. The bar fits beneath the vehicle's accelerator pedal and can be raised into an elevated position, thereby preventing depression of the accelerator pedal. The Teroux patent does not teach or suggest a pedal obstructing device that is retractable into the cabin wall of the vehicle.

U.S. Pat. No. 2,931,207, issued to Fisher, shows a locking device attached to the throttle bar beneath the accelerator pedal of the vehicle. When the device is in the locked position the pedal is prevented from being depressed. The Fisher patent does not teach or suggest a pedal obstructing device that is remotely activated.

U.S. Pat. No. 5,040,387, issued to Knott, Jr., shows a vehicle disablement system for engaging the brake pedal of a vehicle and locking the brakes of the vehicle in the activated position. The Knott, Jr., patent does not teach or suggest a pedal obstructing device that is remotely activated by a portable transmitter.

Various automatic devices for remotely activating vehicle security systems and for remotely locking and unlocking vehicle doors have been introduced. Most commonly, such devices utilize a portable transmitter for sending signals to a receiver unit which activates a security system or locks or unlocks the doors of the vehicle. Illustrations of such devices may be seen in U.S. Pat. No. 4,881,148, issued to Lambropoulos et al.; U.S. Pat. No. 4,825,210, issued to Bachhuber et al.; U.S. Pat. No. 4,663,626, issued to Smith; U.S. Pat. No. 3,725,939, issued to Saltzstein; and U.S. Pat. No. 3,142,166, issued to F. Adam et al. The devices shown in the above referenced patents do not teach or suggest a remotely activated vehicle pedal obstructing device.

U.S. Pat. No. 3,686,672, issued to Ishizuka, shows a radio system for controlling the operation of the shutter of a camera. The system is characterized by a radio transmitter, a radio receiver, and an actuator circuit connected to an electromagnetic plunger which contacts the shutter release mechanism of the camera. The Ishizuka patent does not teach or suggest the use of a radio system for controlling a vehicle pedal obstructing device.

U.S. Pat. No. 4,369,481, issued to Early, and U.S. Pat. No. 5,119,065, issued to Wiehagen, show locking systems which are operated by a light activated system. The Earl patent and the Wiehagen patent do not teach or suggest the use of a light activated system for operating a vehicle pedal obstructing device.

U.S. Pat. No. 5,363,270, issued to Wahba, shows an improved electromagnetic actuator having an integral capacitor and secondary coil for reducing opening and closing times without the need for switching circuits. The Wahba patent does not show or suggest using an electromagnetic actuator to move a vehicle pedal obstructing device.

None of the above inventions and patents, taken either singly or in combination, is seen to describe the instant invention as claimed.

SUMMARY OF THE INVENTION

The present invention is directed to a vehicle disablement system that prevents and deters the unauthorized use of a vehicle by limiting engine operation to idle speed. The vehicle disablement system is characterized by a pedal obstructing device, located beneath the accelerator pedal of the vehicle, that is selectively movable between an obstructing position, engaging the pedal, and an enablement position, clearing the pedal. The system further includes a means for moving the pedal obstructing device between the obstructing and engaging position. In an alternative embodiment of the invention, the means for moving the pedal locking device are controlled by a remotely operated device. The remotely operated device is activated by a signal from a remotely operated portable transmitter.

Accordingly, it is a principal object of the invention to prevent and deter the unauthorized use of the vehicle.

It is another object of the invention to prevent and deter "carjackings"—the unauthorized use of the vehicle while it is being operated.

It is a further object of the invention to prevent and deter the unauthorized use of the vehicle through the use of a pedal obstructing device positioned beneath the accelerator pedal of the vehicle.

Still another object of the invention is to prevent and deter the unauthorized use of the vehicle through the use of a remotely activated pedal obstructing device positioned beneath the accelerator pedal of the vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
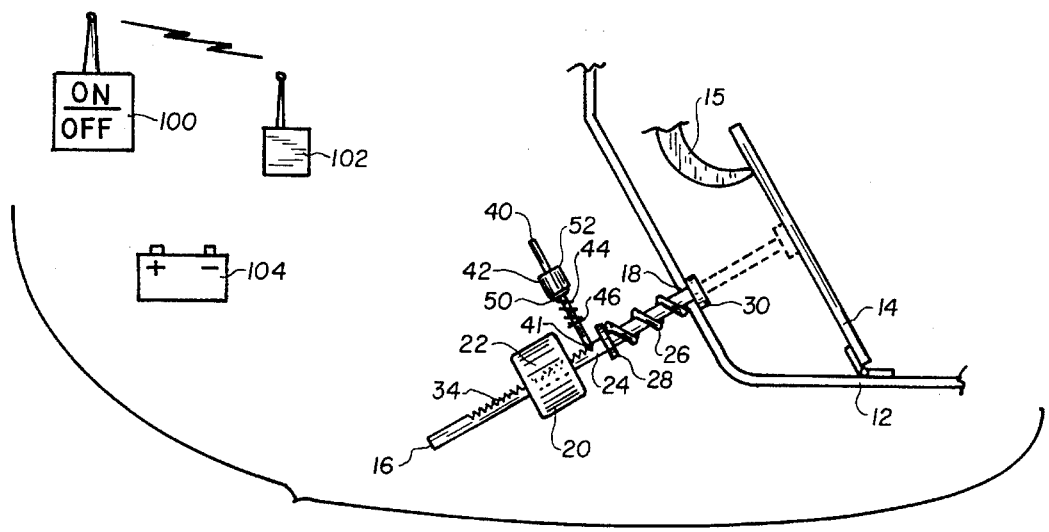
FIG. 1 is a side elevational, somewhat diagrammatic view of the invention installed in a vehicle, and showing the pedal obstructing member in both the activated position and the retracted position.

A vehicle disablement system for limiting engine operation to idle speed by obstructing the accelerator pedal of a motor vehicle is shown in FIG. 1. Conventional parts of a vehicle within which the invention is mounted include a firewall 12 and an accelerator pedal 14 which, in the vehicle shown, includes an accelerator arm 15, depressed by the pedal 14. The major components of the system of this invention include pedal obstructing member 16, which passes through an opening 18 formed through firewall 12, and means 20 for moving the obstructing member 16. Additional components of the system include portable remote control transmitter 100, remote control switch 102, and a power source 104.

FIG. 1 shows a preferred embodiment for the system in which moving means 20 comprise an electromagnetic actuator, first coil 22 (i.e., a solenoid). First coil 22 surrounds cylindrical shaft portion 24. In this embodiment, shaft portion 24 is a ferric composition or has a magnetic material attached externally thereto. A first return spring 26 surrounds shaft portion 24 and is located and confined between vehicle firewall 12 and a retaining collar 28. Retaining collar 28 is fixed on shaft portion 24.

Figure 2:
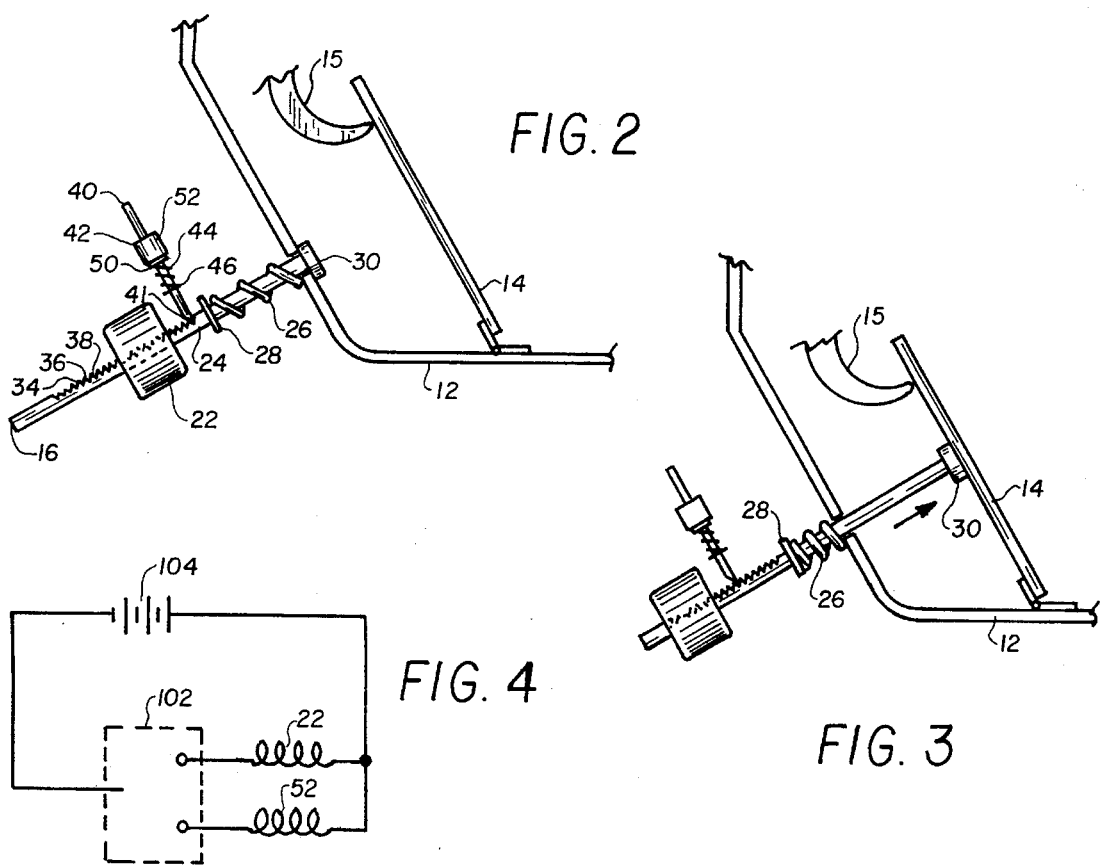
FIG. 2 is a side elevational view of the invention, taken from the right hand side of FIG. 1 and showing the pedal obstructing member in the retracted position.

Pedal obstructing member 16 is selectively movable by moving means 20 between a retracted or vehicle enablement position and an obstructing or activated, vehicle disabling position. First spring 26 biases obstructing member 16 toward the retracted or vehicle enablement position. FIG. 2 shows the retracted or vehicle enablement position, in which head 30 engages vehicle firewall 12. In the retracted or vehicle enablement position, first spring 26 is partially compressed to create a tight seal between head 30 and vehicle firewall 12. A tight seal is necessary both to maintain the integrity of firewall 12 and to prevent external environmental factors, such as water, salt, sand, and cold or hot air, from entering the vehicle interior while the vehicle is in operation.

The system includes a locking means for locking pedal obstructing member 16 in the activated or pedal obstructing position. A locking arm 40 is movable, by locking release means 42, between a locking position and a release position. The tip 41 of locking arm 40 has an angular surface which engages locking teeth 34. Locking teeth 34 each have a first face 36 perpendicular to the longitudinal axis of obstructing member 16, and a second face 38 angled from the longitudinal axis of obstructing member 16. Teeth 34 are formed on and along the surface of shaft portion 24. Second face 38 forms a camming surface that engages the angular surface at tip 41 of locking arm 40, whereby locking arm 40 is pushed back by the camming action of second face 38 as obstructing member 16 continues toward the activated or obstructing position. Once in the locked position, first face 36, being parallel to the longitudinal axis of locking arm 40, prohibits obstructing member 16 from retracting if any force is applied to pedal 14.

Locking arm 40 is spring biased, by a second spring 44, against teeth 34. Second spring 44 surrounds locking arm 40 and is located and confined between a restraining collar 46 and a washer 50. Restraining collar 46 is fixed to locking arm 40. Washer 50 is attached to locking release means 42. FIG. 2 illustrates locking release means 42 as an electromagnetic actuator, second coil 52 (i.e., a solenoid).

Figure 3:
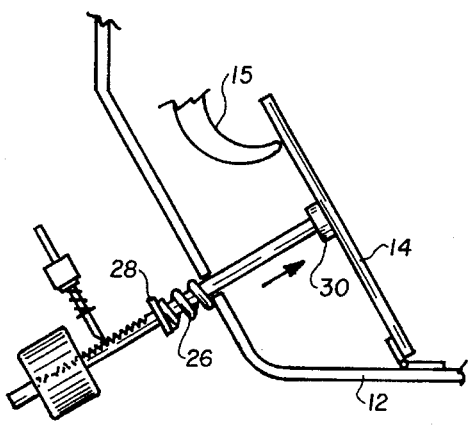
FIG. 3 is a side elevational view of the invention, similar to FIG. 2 but showing the pedal obstructing member in the activated position.

FIG. 3 shows the activated or pedal obstructing position, in which head 30 engages accelerator pedal 14, thereby preventing depression of the pedal by the operator. In the activated or pedal obstructing position, first spring 26 is compressed by restraining collar 28.

Figure 4:
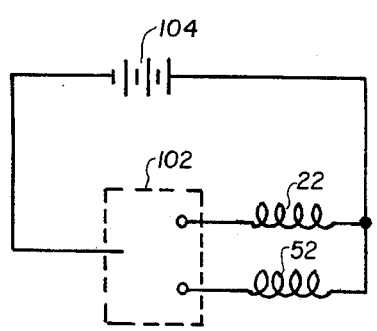
FIG. 4 illustrates an electrical circuit diagram for the invention as shown in FIGS. 1–3.

FIG. 4 shows the electrical configuration of power source 104, remote control switch 102, first coil 22, and second coil 52. First coil 22 is connected in parallel with second coil 52. Remote control switch 102 is positioned to alternatively contact first coil 22 or second coil 52. Remote control switches are well known in the art. For example, remote control systems for door locks are described in U.S. Pat. No. 4,881,148, which is incorporated herein by reference.

In operation, the vehicle driver carries portable remote control transmitter 100 on his person, perhaps conveniently attached to his belt (not shown). To activate the system, the driver presses the "on" switch on the remote control transmitter 100. Transmitter 100 sends a signal to remote control switch 102 which energizes first coil 22. When energized, first coil 22 generates an electromagnetic force which moves pedal obstructing member 16 into the activated or pedal obstructing position. To deactivate the system, the driver presses the "off" switch on remote control transmitter 100. Transmitter 100 sends a signal to remote control switch 102 which energizes second coil 52. When energized, second coil 52 generates an electromagnetic force causing locking arm 40 to disengage pedal obstructing member 16. Pedal obstructing member 16 is returned to the retracted or vehicle enablement position by first return spring 26. Locking arm 40 is returned to the locked position by second return spring 44.

Figure 5:
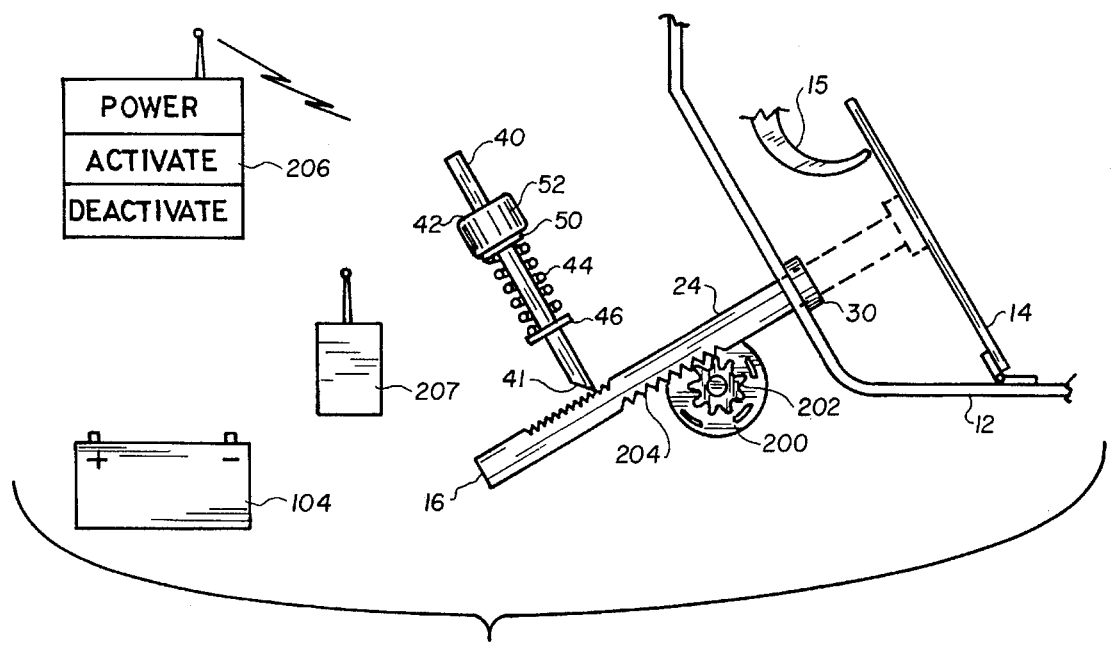
FIG. 5 is a side elevational view similar to FIG. 1, but showing a second embodiment of the invention, and illustrating the pedal obstructing member in both the activated position and the retracted position.

FIG. 5 shows an alternate preferred embodiment of the system in which the means for moving pedal obstructing member 16 is reversible motor 200. Pinion 202 engages rack 204, which is formed in shaft portion 24. Pinion 202 is connected to motor 200. Additional components of this embodiment include portable remote control transmitter 206, and housing 207. Housing 207 contains remote control activation switch 208 and remote control power switch 210 (see FIG. 6).

Figure 6:
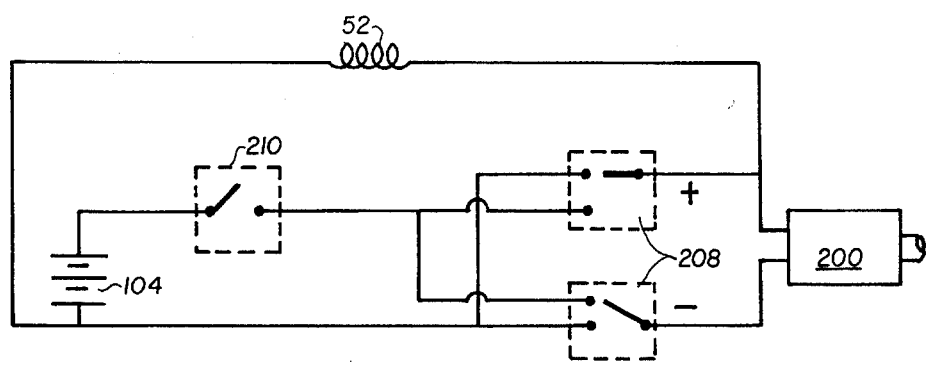
FIG. 6 illustrates an electrical circuit diagram for the invention as shown in FIG. 5.

FIG. 6 illustrates electrical control circuit 212 which includes power source 104, motor 200, second coil 52, remote control activation switch 208, and remote control power switch 210. Remote control activation switch 208 comprises two parallel switches connected in series to power source 104 and motor 200. Remote control power switch 210 is connected in series to power source 104 and remote activation switch 208. Second coil 52 is connected in parallel to remote activation switch 208. Remote control switches are well known in the art, as discussed above in the description of the first embodiment.

In operation, the vehicle driver carries portable remote control transmitter 206 on his person. To activate the system the driver presses the "power" button on transmitter 206. Transmitter 206 sends a signal to remote control power switch 210, which energizes control circuit 212. The driver next presses the "activate" button on transmitter 206. Transmitter 206 sends a signal to remote activation switch 208 which energizes motor 200. Pinion 202 rotates, engages rack 204 and pedal obstructing member 16 moves into the activated or pedal obstructing position.

To deactivate the system the driver presses the "power" button on transmitter 206. Transmitter 206 sends a signal to remote control power switch 210, which energizes control circuit 212. The driver next presses the "deactivate" button on transmitter 206. Transmitter 206 sends a signal to remote activation switch 208 which energizes motor 200 and second coil 52. Locking arm 40 disengages pedal obstructing member 16, pinion 202 rotates in the reverse direction, engages rack 204, and pedal obstructing member 16 moves into the retracted or vehicle enablement position. Locking arm 40 is returned to the locked position by second spring 44.

It is to be understood that the present invention is not limited to the embodiments described above, but encompasses any and all embodiments within the scope of the following claims.

I claim:

1. A partial vehicle disablement system for limiting engine operation to idle speed, by selectively locking the vehicle accelerator pedal against depression, comprising:

an obstructing member movable between obstructing and enabling positions, selectively contacting and completely clearing the accelerator pedal, respectively;

means defining an opening through a vehicle firewall in the vicinity of the vehicle accelerator pedal for enabling said obstructing member to be slidably mounted therethrough, toward and beneath the vehicle accelerator pedal; and a means for moving said obstructing member selectively to said obstructing and enabling positions, said means for moving said obstructing member being located outside of the vehicle firewall and including:

a motor;

a pinion attached to said motor; and a rack formed on said obstructing member, said pinion engaging said rack;

whereby, actuation of said motor moves said obstructing member between said enablement position and said obstructing position.

2. The disablement system according to claim 1, further comprising:

a transmitter for transmitting operating commands, and a remote operated device for deploying said obstructing member responsive to said operating commands.

3. The disablement system according to claim 1, further comprising a locking means movable between locking and release positions selectively contacting and clearing said obstructing member, respectively, for preventing said obstructing member from moving toward said enablement position when in said locking position.

4. The disablement system according to claim 3, wherein said locking means comprises:

a locking arm;

locking arm spring means for biasing said locking arm toward said locking position; and a second coil disposed in respect to said locking arm, effective when energized to develop a second electromagnetic force in opposition to said second mechanical force, thereby moving said locking arm from said locking position to said release position.

5. The disablement system according to claim 4, wherein said locking arm spring means is a second coil compression spring.

6. A partial vehicle disablement system for limiting engine operation to idle speed, by selectively locking the vehicle accelerator pedal against depression, comprising:

an obstructing member movable between obstructing and enabling positions, selectively contacting and completely clearing the accelerator pedal, respectively;

means defining an opening through a vehicle firewall in the vicinity of the vehicle accelerator pedal for enabling said obstructing member to be slidably mounted therethrough, toward and beneath the vehicle accelerator pedal;

a means for moving said obstructing member selectively to said obstructing and enabling positions, said means for moving said obstructing member being located outside of the vehicle firewall and including:

spring means biasing said obstructing member toward said enablement position; and a first coil surrounding said obstructing member, effective when energized to develop a first electromagnetic force in opposition to said first mechanical force, thereby moving said obstructing member frown said enablement position to said obstructing position;

a transmitter for transmitting operating commands; and a remote operated device for deploying said obstructing member responsive to said operating commands.

7. The disablement system according to claim 6, wherein said spring is a coil compression spring.

8. The disablement system according to claim 6, further comprising a locking means movable between locking and release positions selectively contacting and clearing said obstructing member, respectively, for preventing said obstructing member from moving toward said enablement position when in said locking position.

9. The disablement system according to claim 8, wherein said locking means comprises:

a locking arm;

locking arm spring means for biasing said locking arm toward said locking position; and a second coil disposed in respect to said locking arm, effective when energized to develop a second electromagnetic force in opposition to said second mechanical force, thereby moving said locking arm from said locking position to said release position.

10. The disablement system according to claim 9, wherein said locking arm spring means is a second, coil compression spring.

11. A partial vehicle disablement system for limiting engine operation to idle speed, by selectively locking the vehicle accelerator pedal against depression, comprising:

an obstructing member movable between obstructing and enabling positions, selectively contacting and completely clearing the accelerator pedal, respectively;

a means for moving said obstructing member selectively to said obstructing and enabling positions;

means defining an opening through a vehicle firewall in the vicinity of the vehicle accelerator pedal, for enabling said obstructing member to be slidably mounted therethrough, toward and beneath the vehicle accelerator pedal, said means for moving said obstructing member being located outside of the vehicle firewall;

a locking means movable between locking and release positions selectively contacting and clearing said obstructing member, respectively, for preventing said obstructing member from moving toward said enablement position when in said locking position;

a transmitter for transmitting operating commands; and a remote operated device for deploying said obstructing member responsive to said operating commands.

12. The disablement system according to claim 11, wherein the means for moving said obstructing member comprises:

a motor;

a pinion attached to said motor; and a rack formed on said obstructing member, said pinion engaging said rack; whereby actuation of said motor moves said obstructing member between said enablement position and said obstructing position.

13. The disablement system according to claim 11, wherein the means for moving said obstructing member comprises:

spring means for biasing said obstructing member toward said enablement position; and a first coil surrounding said obstructing member, effective when energized to develop a first electromagnetic force in opposition to said first mechanical force, thereby moving said obstructing member from said enablement position to said obstructing position.

\* \* \* \* \*